United States Patent [19]

Khoe et al.

[11] Patent Number: 4,555,810

[45] Date of Patent: Nov. 26, 1985

[54] DISTRIBUTION SYSTEM FOR A LOCAL AREA NETWORK

[75] Inventors: Giok D. Khoe; Johannes H. C. van Heuven, both of Eindhoven, Netherlands

[73] Assignee: U.S. Philips Corporation, New York, N.Y.

[21] Appl. No.: 410,752

[22] Filed: Aug. 23, 1982

[30] Foreign Application Priority Data

Sep. 4, 1981 [NL] Netherlands .................. 8104104

[51] Int. Cl.⁴ .................................. H04B 9/00
[52] U.S. Cl. ................... 455/612; 350/96.15
[58] Field of Search ............... 350/96.16, 96.15, 96.20; 455/612, 610, 617; 370/3

[56] References Cited

U.S. PATENT DOCUMENTS 4,393,516  7/1983  Itani ........................ 455/608
4,408,353  10/1983  Bowen et al. ................ 455/601

FOREIGN PATENT DOCUMENTS 2651776  5/1977  Fed. Rep. of Germany ... 350/96.20

55-26706  2/1980  Japan ....................... 370/3

OTHER PUBLICATIONS

Ishio et al.—"A Two-Way WDM"—European Conf. on Optical Cables, 1978, pp. 646-655.
Krahn—Optical Cable Network—Conf. Cherry Hill, N.J.—Proc. of the 29 Internat. Wire & Cable Symposium-18-20, No. 1980, pp. 418-423.

Primary Examiner—Joseph A. Orsino, Jr.
Attorney, Agent, or Firm—Thomas A. Briody; William J. Streeter; Marianne Rich

[57] ABSTRACT

A distribution system for a local area network has a distribution unit which is coupled to a plurality of subscribers' premises via optical transmission links. Each subscriber is provided with a terminal unit having an input coupled to an optical transmission link. The terminal unit has a plurality of outputs which are connected to optical wall sockets. Opto-electrical converters are provided at each socket. Each terminal unit has a power splitter and a distribution box. The distribution box has a plurality of inputs, a larger number of optical outputs, and a plurality of links between the inputs and outputs.

6 Claims, 7 Drawing Figures

DISTRIBUTION SYSTEM FOR A LOCAL AREA NETWORK

BACKGROUND OF THE INVENTION

1. Field of the Invention

The invention relates to a distribution system for a local area network. The distribution system comprising a distribution unit which is coupled to a plurality of subscribers' premises via optical transmission links. The premises of each subscriber are provided with a common terminal unit having at least one input and a plurality of outputs, the input of the common terminal unit being coupled to an optical transmission link and the outputs being connected to a plurality of sockets via further transmission links.

2. Description of the Prior Art

In this specification a local network is intended to mean all transmission paths and equipment between a central unit and sockets provided at the premises of the subscriber. A distribution system of the type mentioned is disclosed in, for example, "Proceedings of the IEEE", volume 68, no. 10, October 1980, page 1295, FIG. 5. In the common terminal unit of this prior art distribution system the incoming optical signal is converted into an electrical signal, whereafter the electrical signal is applied to a demultiplexer. The outputs of the demultiplexer are connected via coaxial cables to the respective electric wall sockets in the subscriber's premises. The wall sockets are further connected via coaxial cables to the inputs of a multiplexer, the output of which is connected to an electro-optical converter. This combination is employed for the optical signal outgoing from the subscriber's premises to provide services, such as, for example, telephone, channel selection for television, alarm systems etc.

A disadvantage of this prior art system is the fact that the local network is not tolerant to future system changes and extensions, such as the choice of analog or digital signals, bandwidth, bit rate, number of services and connections per subscriber. When, for example, a new colour or a new service is added to the existing optical transmission system, it will be necessary to make changes in all the common terminal units in a local network. Multiplexers, demultiplexers, switching apparatus, etc. will have to be adapted to this new colour or service.

In addition, the known distribution system has the disadvantage that when common terminal unit equipment becomes defective for example the demultiplexer, this may cause all services, such as television, radio, telephone, etc. to disappear simultaneously. This can be prevented from occurring by providing duplicate equipment in the common terminal unit. As soon as one set of equipment present in the common terminal unit becomes defective, a switch to the relevant duplicate set of equipment is automatically made. An alarm may then, for example, be triggered simultaneously, so that the defective equipment can be replaced. This method has, however, the disadvantage that duplicate equipment must be provided for every piece of equipment present in the common terminal unit and additional switching equipment is also required. This means a considerable increase in the costs of the common terminal unit at each subscriber's premises.

The invention has for its object to provide a distribution system for a local area network, in which the above-mentioned disadvantages are reduced.

SUMMARY OF THE INVENTION

The invention provides a distribution system as described in the opening paragraph characterized in that the input of the common terminal unit is connected to the outputs of the common terminal unit via the series arrangement of a power splitter and a distribution box, the number of inputs of the distribution box being less than the number of outputs thereof and the distribution box comprising means for selectively through-connecting its inputs to an equal number of outputs, the further transmission cables being optical cables and the sockets being optical sockets.

The measures in accordance with the invention enable the provision of a local network which is wholly transparent. This means that when a new colour or a new service is added, no changes need to be made in the common terminal units of the local network. Furthermore it is possible to produce in a very simple manner an intercommunication system in each subscriber's premises.

No further active equipment is present in the common terminal unit, so that no duplicated equipment and additional switching circuits and alarm systems are required, which drastically reduces the installation costs of the common terminal unit. Furthermore no additional postal service is required anymore in the subscriber's premises.

Embodiments of the invention will now be described by way of example with reference to the accompanying drawings.

DETAILED DESCRIPTION OF THE PREFERRED EMBODIMENTS

Figure 1:
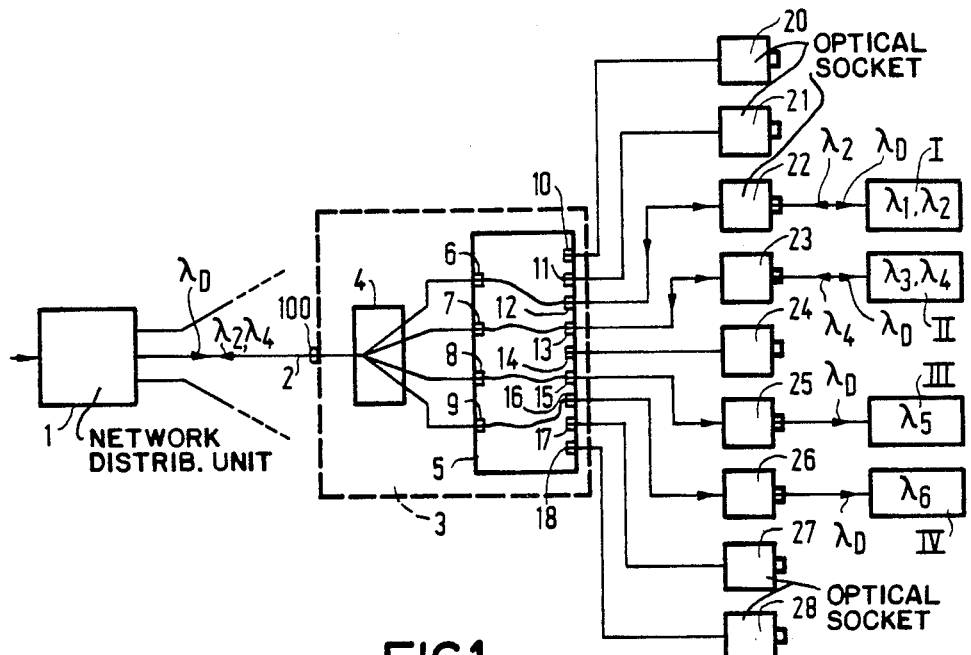
FIG. 1 shows a first embodiment of a distribution system in accordance with the invention.

In the embodiment shown in FIG. 1 reference numeral 1 denotes the distribution unit of a local network using optical fibres. A common terminal unit 3 has an input 100 connected to the distribution unit 1 via an optical fibre 2. The input 100 of the common terminal unit 3 is connected to inputs 6, . . . , 9 of a distribution box 5 via a power splitter 4. The inputs 6,7,8 and 9 of the distribution box are internally through-connected to outputs 12, 13, 15 and 16 respectively of the distribution box 5. The outputs 12, 13, 15 and 16 of the distribution box 5 are connected to wall sockets 22, 23, 25 and 26 respectively via optical fibres. The outputs 10, 11, 14, 17 and 18 of the distribution box 5 are connected to optical wall sockets 20, 21, 24, 27 and 28 respectively via further optical fibres. Terminal equipments I, II, III and IV are connected to the wall sockets 22, 23, 25 and 26 respectively.

Figure 2:
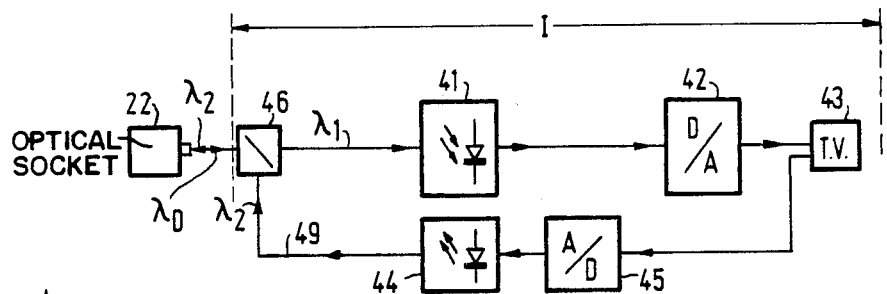
FIG. 2 shows the structure of one form of terminal.

The embodiment illustrated in FIG. 1 shows the simplest connection between a common terminal unit 3 and the optical wall sockets 20, . . . , 28, in the premises of a subscriber. The optical fibres are used for both optical forward transmission with the wavelengths $\lambda_D = \lambda_1$, $\lambda_3$, $\lambda_5$ and $\lambda_6$ and for the optical return transmission with the wavelengths $\lambda_2$ and $\lambda_4$. Suitable values for the wavelengths are, for example:

$\lambda_1 = 780$ nm
$\lambda_3 = 810$ nm
$\lambda_5 = 840$ nm
$\lambda_6 = 870$ nm
$\lambda_2 = 1210$ nm
$\lambda_4 = 1260$ nm FIG. 2 shows how, for example, a television set 43 can be connected to an optical wall socket 22. The wall socket 22 is connected to the input of the television set 43 via the series arrangement of an optical filter 46, an opto-electric converter 41 and a digital-to-analogue converter 42. The television set 43 is further connected to the optical filter 46 via the series arrangement of an analogue-to-digital converter 45 and an electro-optical converter 44. It should be noted that all this is based on the use of a digitized television signal as such a television signal, offers a better solution than an analogue signal in view of the linearity and noise problems. In addition, digitizing enables a better picture quality and lower interference sensitivity to be obtained. The circuits 41, 42, 44, 45 and 46 may be connected in the television set 43 or in a separate unit which plugs in to the wall socket 22.

All the optical input signals which have wavelengths as specified hereinbefore are applied to the input of the optical band filter 46. The optical band filter 46 transmits only the optical signal having the wavelength $\lambda_1 = 780$ nm. The optical signals having the wavelengths $\lambda_3$, $\lambda_5$ and $\lambda_6$ are reflected by the optical filter 46 into the optical fibre 49, whereafter they are blocked by the electro-optical converter 44, as the electro-optical converter 44 cannot effect an reverse operation. The digital television signal having the wavelength $\lambda_1$ is converted by means of the opto-electrical converter 41 into a digital-electric signal which by means of the digital-to-analogue converter 42 is converted into an analogue television signal and is thereafter applied to a conventional television set 43. An analogue electric channel selection signal of the television set 43 is converted by means of the analogue-to-digital converter 45 into a digital electric channel selection signal which is converted by means of the electro-optical converter 44 into an optical channel selection signal having a wavelength $\lambda_2$. This optical channel selection signal is applied via the optical fibre 49 to the optical band filter 46 which is of such a construction that this optical signal is reflected into the fibre connected to the wall socket 22, whereafter the optical signal is further conveyed to the distribution unit 1, where the desired channel selection is accomplished.

An interference filter as described in "IEEE Transactions on Communications", Volume, Com-26, No. 7, July 1978, page 1983 may be used as the optical filter 46.

A power splitter which is suitable for use in the distribution system is disclosed in, for example, "Electronics Letters", Volume 15, Nov. 8, 1979, No. 23, pages 757–759.

Conventional connectors for glass optical fibres which are of such a construction that they can be provided on the wall, floor or ceiling are suitable for use as wall sockets. Conventional connectors are known which are suitable for the optical connections in the distribution box 5.

Figure 3:
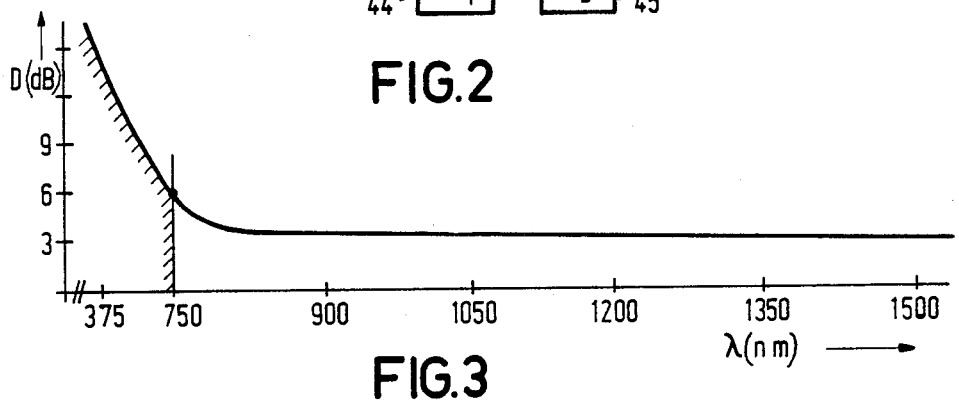
FIG. 3 shows an attenuation wavelength characteristic of an optical fibre.

The distribution system shown in FIG. 1 has the additional advantage that it can be used for intercommunication between several wall sockets in the subscriber's residence. This facility may be achieved by inserting an optical filter between the input 100 of the common terminal unit 3 and the power splitter 4. This optical filter transmits a portion of the spectrum and reflects the rest. An advantageous arrangement is to make the portion of the spectrum to be reflected that which is subjected to a high attenuation in the optical fibres. This spectral portion is not suitable for long distance transmission, but over the short distances inside the house little attenuation is produced. FIG. 3 shows how the attenuation D in a fibre depends on the wavelength used. For wavelengths less than 750 nm the attenuation increases considerably, so that this portion of the spectrum is not suitable for long distance transmission but is suitable for intercommunication within a subscriber's residence. The optical filter reflects this portion of the spectrum and transmits the portion above 750 nm with little attenuation. The residual energy from the spectrum having wavelengths less than 750 nm, which may possibly be transmitted because of imperfections in the optical filter will be still further attenuated by the high attenuation produced in the optical fibre 2. Thus the secrecy of the internal communication within a subscriber's residence may be assured.

FIG. 1 shows an embodiment of a distribution system in which the cable connections inside the house are in the form of single fibres. The wall sockets 22 and 23 or the equipment I and II connected thereto must consequently be provided with optical duplex modules to separate the forward signals downstream $\lambda_D$ and return signals upstream $\lambda_2$ and $\lambda_4$. An example of such an optical duplex module is described in "IEEE Transactions on Communications", Volume Com. 26, No. 7, July 1978, page 1085, FIGS. 10 and 12.

Figure 4:
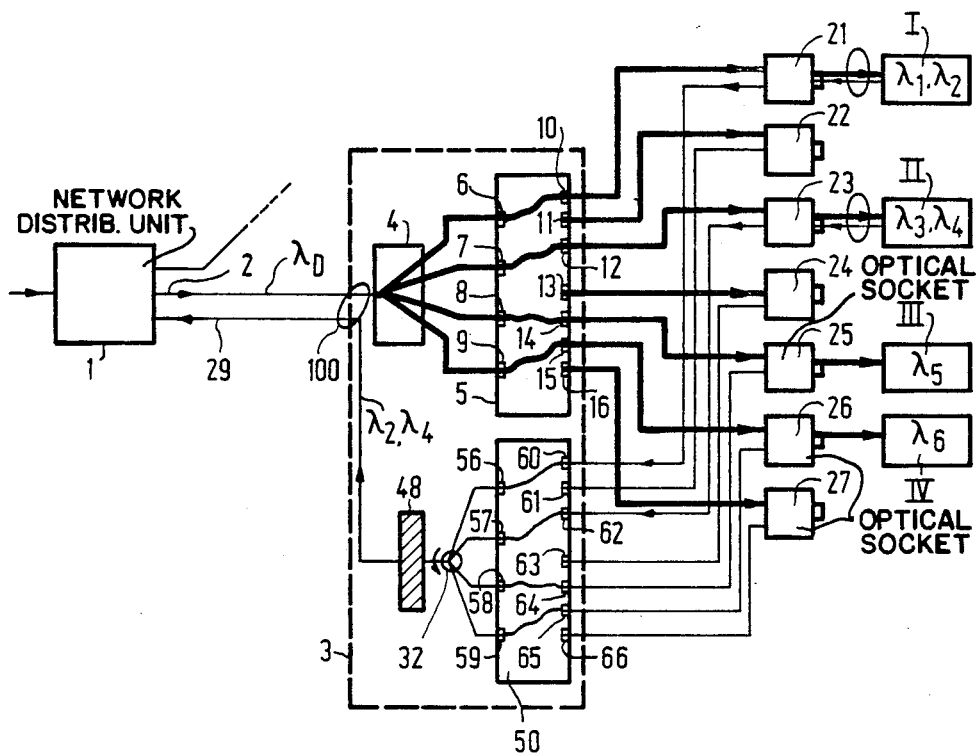
FIG. 4 shows a second embodiment of a distribution system in accordance with the invention.

In the embodiment shown in FIG. 4 the input 100 of the common terminal unit 3 is connected to the central distribution unit 1 via a first optical fibre 2 for forward transmission and a second optical fibre 29 for return transmission. The optical fibre 2 is connected via a power splitter 4 to a first distribution box 5, whose outputs 10, . . . , 16 are connected via a first set of optical fibres to optical wall sockets 21, . . . , 27 respectively. The second optical fibre 29 is connected via an optical filter 48 and a power splitter 32 to a second distribution box 50, whose outputs 60, . . . , 66 are connected to optical wall sockets 21, . . . , 27 respectively via a second set of optical fibres. The terminals I, II, III and IV are connected to optical wall sockets 21, 23, 25 and 26 respectively.

Figure 5:
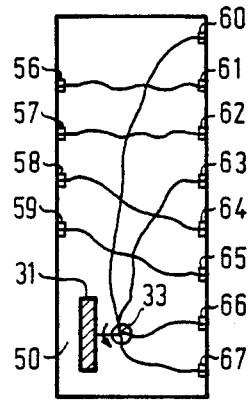
FIG. 5 shows a construction of a distribution box which enables intercommunication within a subscriber's premises.

In the embodiment shown in FIG. 4 a double in-house cable system is used. Each optical wall socket is now connected to the common terminal unit 3 via two fibres, one for the forward signals and one for the return signals. Duplex modules are no longer required in the terminals I, . . . , IV since the forward signals and return signals are now conveyed through separate optical fibres. In addition, it is now possible to give the first set of optical fibres, for forward signals, a diameter and a numerical aperture which is larger than the diameter and numerical aperture of the optical fibre 2. The first set of optical fibres may, for example, have a diameter of 100 microns and a numerical aperture of 0.30. This results in a drastic reduction in the losses in welding spots and connection points. A large number of optical wall sockets can be fitted throughout the subscriber's residence. A possible distribution pattern is, for example, 4 wall sockets in the living room and two in each of the three bedrooms. Only some of the optical wall sockets will be connected to an apparatus. If a connection is required in an other place, this can be done in a simple way by connecting the relevant apparatus flexes to other wall sockets and to make at the same time the proper through-connections in the distribution boxes 5 and 50. As the forward and return transmission is now effected through separate fibres the choice of the wavelengths of the forward signals does not depend on the wavelengths of the return signals. For example:

$\lambda_1 = 1210$ nm
$\lambda_3 = 1290$ nm
$\lambda_5 = 870$ nm
$\lambda_6 = 820$ nm
$\lambda_2 = 870$ nm
$\lambda_4 = 820$ nm The optical filter 48 has as its function to reflect the wavelengths which are used for intercommunication in the subscriber's residence. Examples of intercommunication are: transmission of signals from a video recorder in the living room to a television set in a bedroom, safety systems, babyphones and connecting different wall sockets to a home computer. In the embodiment shown in FIG. 4 intercommunication is only possible between the wall sockets 21, 23, 25 and 26. If inter communication is wanted between the wall sockets 22, 24 and 27, then a second distribution box 50 must be provided which may be constructed as shown in FIG. 5. The outputs 60, 63, 66 and 67 which are not connected to one of the inputs 56, 57, 58 and 59 are coupled to an optical mirror 31 via a power splitter 33, which interconnects all the unused wall sockets.

Figure 6:
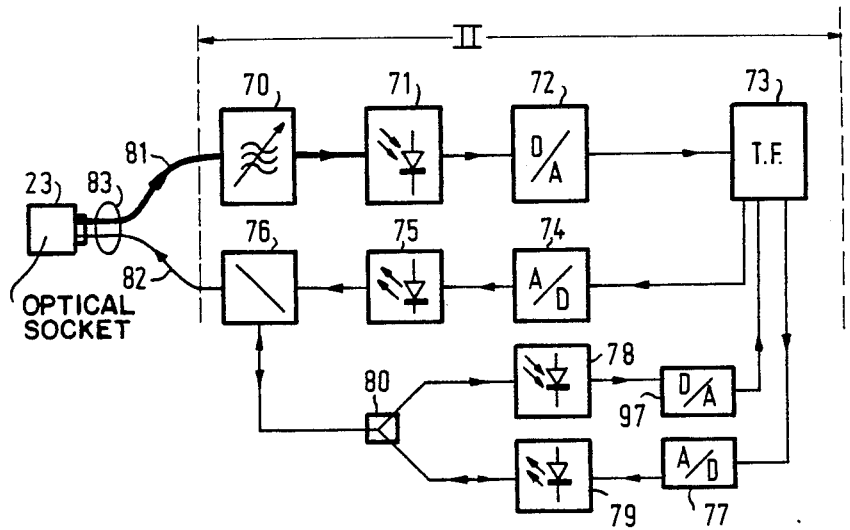
FIG. 6 shows the structure of a further terminal.

FIG. 6 shows an embodiment which illustrates how a terminal II incorporating a telephone may be constructed. The optical signal from the optical wall sockets 23 is conveyed to an optical band filter 70 via an optical fibre 81. The filter 70 passes an optical signal having a wavelength of 1290 nm which is converted by the opto-electrical converter 71 into an electric signal. This electric signal is converted into an analogue electric signal by means of the digital-to-analogue converter 72 and is applied to the telephone set 73. The analogue electric signal coming from the subscriber is converted by means of the analogue-to-digital converter 74 into a digital electric signal which is thereafter converted by means of the electro-optical converter 75 into a digital-optical signal having a wavelength of 820 nm. This optical signal is radiated into the fibre 82 via an optical filter 76 and conveyed further to the distribution unit 1. FIG. 6 also shows how it is possible to communicate from terminal II with a second telephone set which is located elsewhere in the subscriber's residence, while the connection of the telephone in the terminal II to a different subscriber is maintained. To this end one side of the telephone set 73 is connected to a power splitter 80 via a digital-to-analogue converter 97 and an opto-electrical converter 78 and the other end is connected to the power splitter 80 via an analogue-to-digital converter 77 and an electro-optical converter 79. The power splitter 80 is coupled to the optical filter 76 via an optical fibre in such a way that the optical intercommunication signal is radiated into the optical fibre 82. Owing to the fact that the circuits 71, 75, 78 and 79 are unilaterally operating circuits it is not necessary to provide duplex modules in the terminal II.

Figure 7:
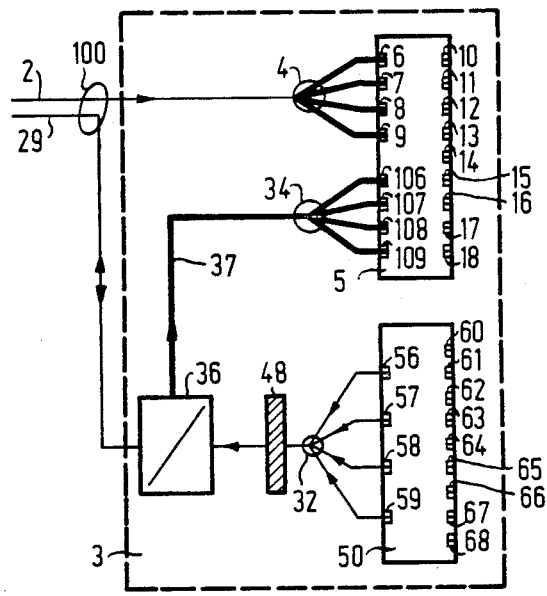
FIG. 7 shows a third embodiment of a distribution system in accordance with the invention.

If more optical wavelengths are desired for the forward transmission than for the return transmission, this can be realized in the manner as shown in FIG. 7. The additionally required optical forward signals (downstream) are now conveyed to the common terminal unit 3 via the optical fibre 29, radiated into the optical fibre 37 via the optical band filter 36 and thereafter conveyed to additional inputs 106, 107, 108 and 109 of the first distribution box 5 via a power splitter 34. The optical band filter 36 transmits the optical return signals (upstream), whose wavelengths are located in, for example, the range from (780-890 nm). The optical forward signals which reach the optical band filter 36 via the fibre 29 have, for example, wavelengths longer than 1200 nm and are radiated into the optical fibre 37 by the filter 36. In this way 8 optical forward signals and 4 optical return signals are now available for communication between the distribution unit 1 and the subscriber. As in the embodiment shown in FIG. 4, the filter 48 transmits all wavelengths longer than 750 nm and reflects wavelengths below 750 nm, allowing intercommunication in the subscriber's residence, as described in the foregoing. Preferably, the diameter and the numerical aperture of the fibre 37 are chosen larger than the diameter and the numerical aperture of the fibres 2 and 29, as a result of which coupling losses are considerably reduced.

What is claimed is:

1. A distribution system for a local area network, the distribution system being of the type comprising a distribution unit which is coupled to a plurality of subscriber's premises via optical transmission links, the premises of each subscriber being provided with a common terminal unit having at least one input and a plurality of outputs, the input to the common terminal unit being coupled to an optical transmission link and the outputs being connected to a plurality of sockets via further transmission links, wherein the improvement comprises the input of the common terminal unit is connected to the outputs of the common terminal unit via the series arrangement of a power splitter and a first distribution box the number of inputs of the distribution box being less than the number of outputs thereof and the distribution box comprising means for selectively through-connecting its inputs to an equal number of outputs, the further transmission links being optical cables and the sockets being optical sockets, wherein the input of the common terminal unit is connected to the distribution unit via first and second optical fibers, the first optical fiber being connected via a power splitter to the first distribution box whose outputs are connected to the respective sockets via a first set of optical fibers, the second optical fiber being connected via an optical filter and a second power splitter to a second distribution box, whose outputs are connected to the respective sockets via a second set of optical fibers.

2. A distribution system as claimed in claim 1, wherein those outputs of the second distribution box which are not connected to an input are coupled to a mirror via a power splitter.

3. A distribution system as claimed in claim 1, wherein the second optical fiber is connected to the inputs of the second distribution box via the series arrangement of a first optical filter, a second optical filter and a power splitter, the first optical filter being coupled via a power splitter to those inputs of the first distribution box which are not coupled to the first optical fiber.

4. A distribution system as claimed in claim 1, wherein the numerical aperture of the optical axis and the core diameter of the first set of optical fibers and the optical fibers arranged between the inputs of the first distribution box and the power splitter are larger than the numerical aperture and the core diameter of the other optical fibers of the distribution system.

5. A distribution system as claimed in claim 4, wherein those outputs of the second distribution box which are not connected to an input are coupled to a mirror via a power splitter.

6. A distribution system as claimed in claim 4, whereby the second optical fiber is connected to the inputs of the second distribution box via the series arrangement of a first optical filter, a second optical filter and a power splitter, the first optical filter being coupled via a power splitter to those inputs of the first distribution box which are not coupled to the first optical fiber.

* * * * *